June 27, 1972     N. RUBENSTEIN     3,672,856
CENTERING FIXTURE
Filed Sept. 14, 1970     3 Sheets-Sheet 1
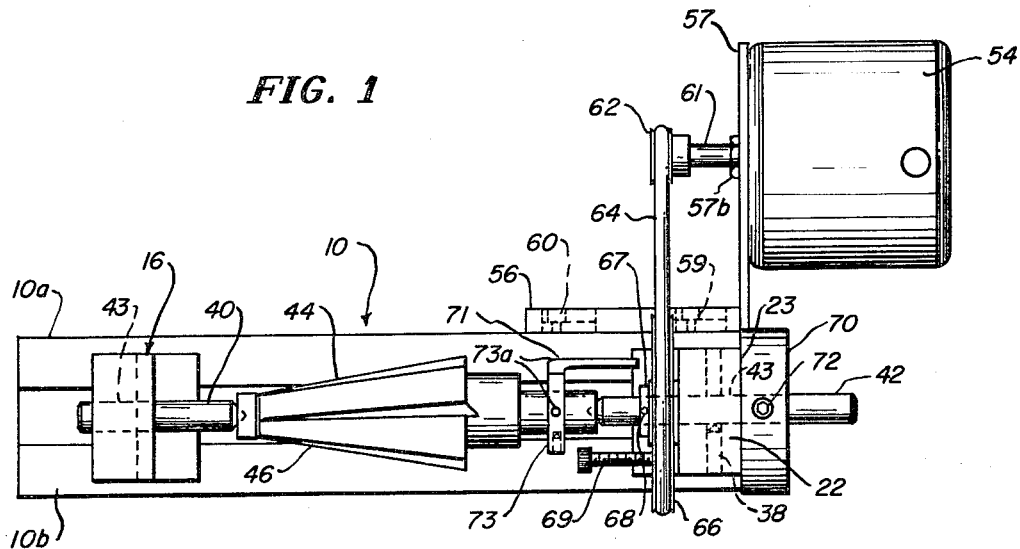
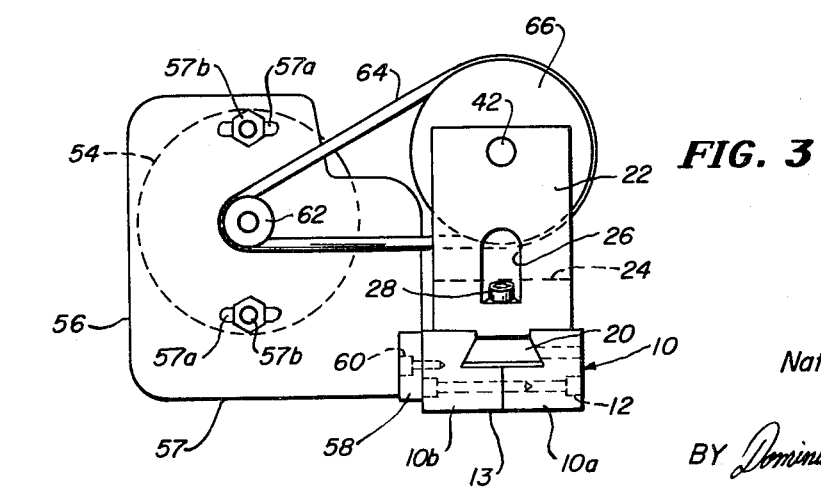
INVENTOR
Nathan Rubenstein
BY *Dominik, Knechtel & Godula*
ATTYS.

June 27, 1972     N. RUBENSTEIN     3,672,856

CENTERING FIXTURE

Filed Sept. 14, 1970     3 Sheets-Sheet 2

INVENTOR
Nathan Rubenstein

BY Dominik, Knechtel & Godula
ATTYS.

June 27, 1972  N. RUBENSTEIN  3,672,856
CENTERING FIXTURE
Filed Sept. 14, 1970  3 Sheets-Sheet 3
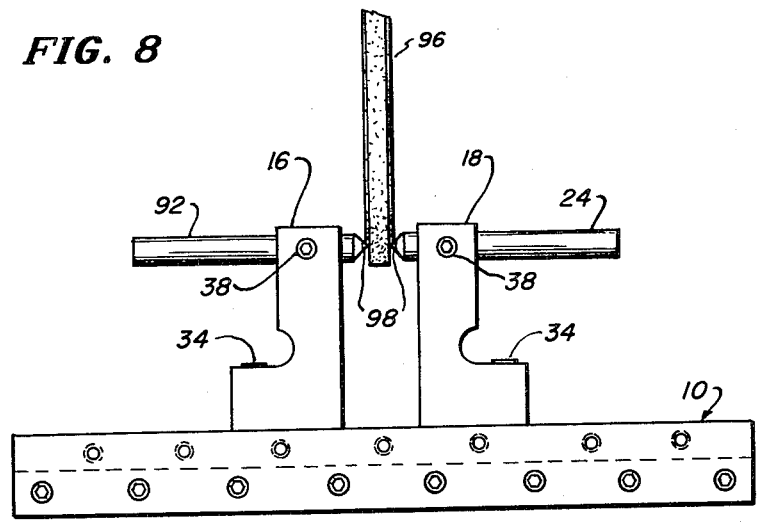
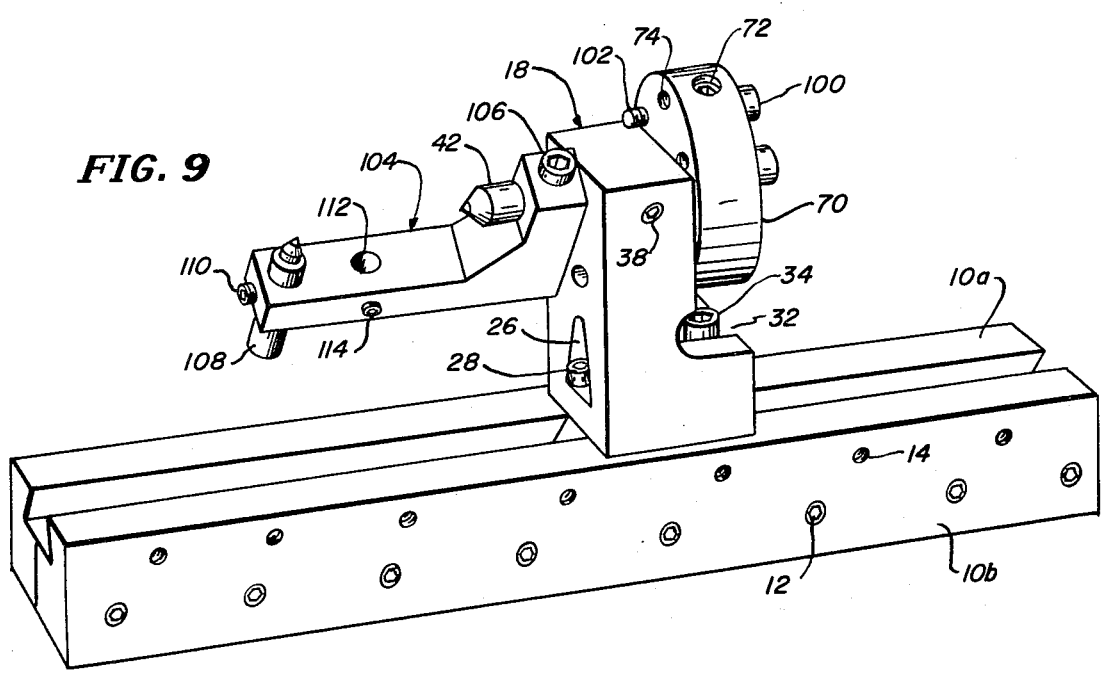
INVENTOR
Nathan Rubenstein
BY Dominik, Knechtel & Godula
ATTYS.

United States Patent Office 3,672,856
Patented June 27, 1972

3,672,856
CENTERING FIXTURE
Nathan Rubenstein, 1506 Birchwood Ave.,
Chicago, Ill. 60626
Filed Sept. 14, 1970, Ser. No. 72,053
Int. Cl. B24b 41/06
U.S. Cl. 51—237                                 9 Claims

ABSTRACT OF THE DISCLOSURE

A fixture having reversible posts and repositionable centers for holding workpieces for processing by a surface grinder, such as outside diameter grinding. The fixture is also used for treating a workpiece such as dressing radii on a grinding wheel forming a true reduced thickness width on a grinding wheel, or using a form to crush a wheel. The fixture permits versatile use, and it is dimensioned so that it may be readily adaptable to be held by a magnetic chuck placed on a surface grinder.

This invention relates to an improved fixture of the type where posts are slideably mounted on a rail or base; and the invention particularly relates to an improved fixture of this type which can be used in versatile ways to hold workpieces for outside diameter grinding on ordinary machine shop surface grinders, as well as processing crush forms in grinding wheels, as well as dressing grinding wheels in different ways.

It is common in machine shop technology to provide special grinders with fixture components for holding particular workpieces for particular processing operations. This is normally an expensive undertaking because such grinding machines are specially made for the job, and cannot be used for basically unrelated work projects.

Outside diameter grinding is a very common procedure in the machine shop art, and such workpieces are ground either to obtain a uniform outside diameter on all or part of the workpiece; or a varying diameter such as a tapered outside diameter. As stated, specialized grinding apparatus has been employed for these purposes. It is understandable that it would be highly desirable to provide an apparatus which could be used to obtain efficient outside diameter grinding of workpieces in improved and versatile ways.

Another common procedure in the machine shop technology is the dressing of grinding such as radius and side dressing. Either an outside or inside radius is formed on such wheels by employing fixtures with diamond center. Such centers may be also used to reduce the sides along the peripheries to obtain reduced widths for slotting workpieces. It is a common practice to employ specially designed apparatus for this purpose, and it will be understood that the art would welcome an apparatus which can perform this operation in an efficient way while still being capable of use in other applications.

A still another important practice in machine shop technology is the processing of crush form wheels by the crush forming process. The crush forming technique has been recognized in the art as being a highly skilled procedure requiring specialized training and apparatus for its successful practice. It will be appreciated that the art would welcome an apparatus which can be reliably employed to practice crush forming without requiring unusual levels of training or skill. The art will also welcome apparatus which can be used for this purpose without being further limited in its application.

Surface grinders, such as reciprocating surface grinders, may be commonly found in shops because their expense is not unduly high. Such surface grinders have a grinding wheel which may be reciprocated or variously moved above a workpiece, such as in outside diameter grinding. Magnetic chucks are often used in conjunction with such surface grinders for holding various workpieces; accordingly, it would be a definite contribution to the art to provide an apparatus or fixture which can hold workpieces by said magnetic chucks on said surface grinders for treating such workpieces in versatile ways. It is also desirable to be able to use such surface grinders and magnetic chucks together with an apparatus which allows a grinding wheel to be treated so as to dress the radius of the wheel, and to form a crush wheel.

It is accordingly one important object of the present invention to provide an improved workpiece holding fixture which is simple in its construction but highly versatile in its many uses, and which improved fixture is particularly adapted to be employed in combination with common surface grinders.

Another important object of the present invention is to provide a fixture which can be used in an advantageous way for treating a workpiece, as well as holding a workpiece for processing by surface grinders or the like. In accordance with such objects, the fixture is very quickly and simply manipulated to hold tools, such as diamond centers or form rollers, for processing specially designed grinding wheels.

A still another important object of the present invention is an apparatus of the type described to which conventional auxiliary tool features such as indexing means and motors may be mounted in convenient and simple ways. Other auxiliary features may be mounted to the improved apparatus such as specialized workpiece holding brackets, connecting elements between the workpieces and indexing means, and still other auxiliary features.

A still yet another important object of the present invention is to provide an improved apparatus of the type described which permits the attainment of the desired features with relatively few elements, namely, improved posts which can be reversibly mounted on a specialized rail.

The foregoing objects are attained with still other objects which will occur to practitioners, from time to time, as they consider the invention in the following disclosure which include drawings, wherein:

FIG. 1 is a top plan view of the fixture in work holding operation, together with an auxiliary motor mounted to the fixture;

FIG. 2 is a side elevational view of the apparatus of FIG. 1, shown in combination with means to attain tapered outside diameter grinding of the workpiece on conventional surface grinders;

FIG. 3 is an end elevational view of the apparatus shown in FIGS. 1 and 2, taken from the end opposite the end to which the auxiliary motor is mounted;

Figure 7:
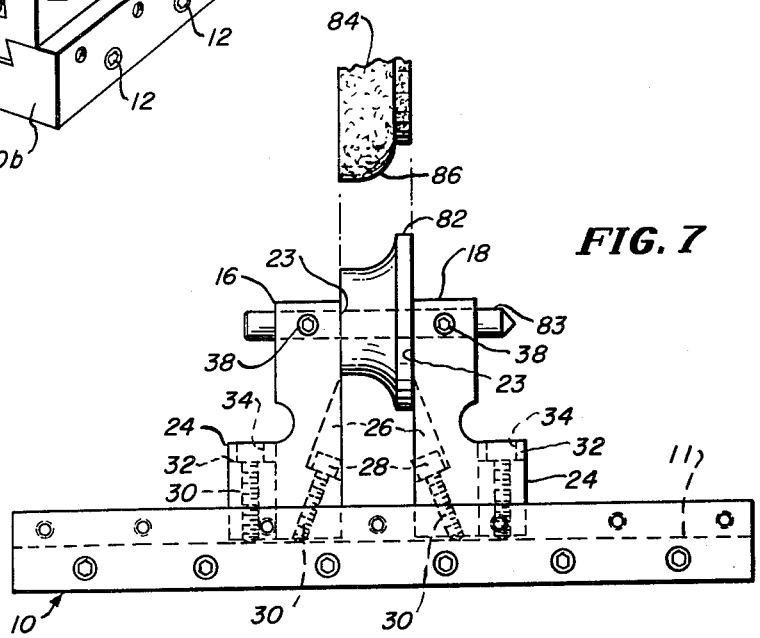
FIG. 7 is a side elevational view of the fixture utilized in FIGS. 1–3, but in a different arrangement to hold a form roller useful in the crush forming technique.

FIG. 8 is a side elevational view of a fixture disposed generally as shown in the view of FIG. 7, but with different means for treating a workpiece, namely, dressing the sides of a wheel which is to be used for slotting; and FIG. 9 is a perspective view showing the fixture of the other views, but wherein only one of the two posts is employed for holding a work holding bracket for dressing radii in a wheel by conventional methods.

The following description will make use in large part of the same numerals to describe like elements and parts on similar structures, as well as repeated illustrations of the parts in the various views.

The fixture which is utilized to different degrees in the various embodiments includes a base or rail 10. In the illustrated form, the rail consists of two mating half sections 10a and 10b, such sections joining along a mid-line of an channel or dowel groove 11 in the rail. The channel 11 follows the longitudinal axis.

The rail has a substantially rectangular cross section with a flat bottom 13 adapted to be seated on the magnetic chuck, or the like, which is used in association with conventional surface grinders. The half sections of the rail are shown fastened together by fasteners in aligned threaded apertures, all shown as 12. The sides of the rail also preferably are provided with a plurality of threaded apertures 14 to serve in mounting auxiliary tool elements.

The rail is shown with a pair of posts 16, 18, slidably mounted in the channel 11. Each of the posts has a bottom dowel slide 20 adapted to slideably engage said channel. Each of the posts includes a vertical arm 22 having an outside face 23. The posts also have a horizontal arm 24 so that the post is a substantially L-shaped block.

The outside face of the vertical arm has an angular recess 26 into which is introduced a set screw 28 which passes through an angular threaded bore 30 which extends from the outside face 23 to the base of the dowel slide 20. A horizontal arm recess 32 is provided in which is introduced at a set screw 34 which passes through a vertical bore 36 extending from the top of the horizontal arm 24 to the base of the dowel slide 20.

An upper portion of the posts, in particular, the upper sides of the vertical arms are provided with a set screw 38 which is mounted in a threaded bore not otherwise indicated. The set screws 38 fix the positions of centers 40 in post 16 and 42 in post 18. The centers are translatable in smooth surface passageways 43 in the posts. The views of FIGS. 1 and 2 particularly show the centers 40, 42 positioning a workpiece 44 subjected to the outside diameter grinding. This workpiece has a plurality of tapered fins 46, and the desired angular position for outside diameter grinding is obtained by employing a conventional taper sine bar or block 48 under the rail 10. The top of the sine bar contacts the flat bottom 13 of the rail, and such sine bar may be fixed to the bottom of the rail 10 to obtain a unitary assembly. Sine pins 50 and 52 are fixed to the bar to obtain an exact separating dimension. Desired angular processing is determined by recourse to available sine blocks to obtain the sizes of corresponding dimension blocks.

Looking again at FIGS. 1–3, the improved fixture permits the mounting of auxiliary tool fixtures such as the electric motor 54 which is mounted to the rail 10 by means of an angle bracket 56. The illustrated bracket has a plate 57 extending laterally of the longitudinal axis of the rail, and said plate is provided with over-sized slots 57a through which bolts 57b pass and engage threaded bores (not shown) in the motor 54. The fastener assembly, consisting of the bolts and over-sized slots, permits adjustability of the angle brackets 56. The angle bracket also has a slotted arm 58 which has a long axis parallel to the long axis of the rail. The slotted arm has a plurality of slots 59 shown in dotted lines in the view of FIG. 2. Bolts 60 pass through said slots and engage one or more of the threaded apertures 14 provided in the side of the rail.

The motor shaft 61 is in normal relationship to the plate 57, and the end of this shaft is fitted with a driving sheave 62. An endless belt 64 turns around driving sheave 62 and driven sheave 66 which is freely mounted to center 42 by annular ring 67 having a set screw 68 passing therethrough. The sheave 66 is shown with a positioning or gauging screw 69 mounted to one of a plurality of threaded bores (not shown) in the face thereof. Such screw is selectively positioned to butt against hook 71 of dog 73 mounted to the workpiece by set screws 73a, and thereby cause the workpiece to be rotated.

Figure 4:
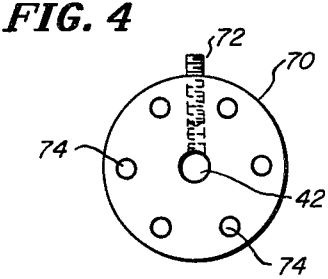
FIG. 4 is an end elevational view of an indexing disc mountable on the apparatus shown in FIGS. 1–3.
Figure 6:
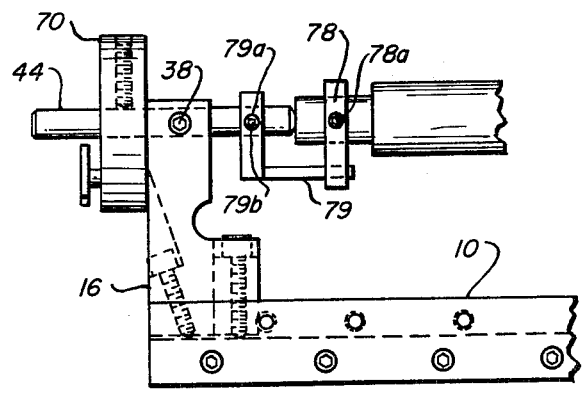
FIG. 6 is a side elevational view of the fixture shown in portion in the view of FIG. 5.
Figure 5:
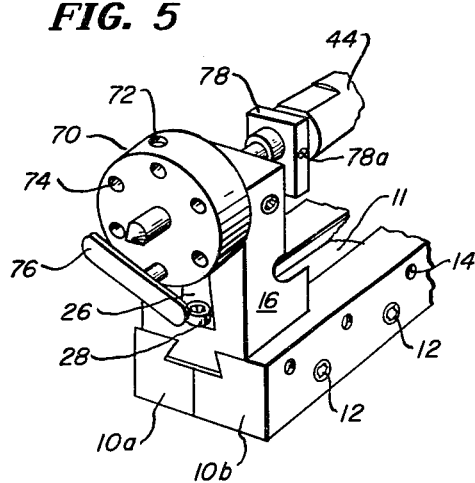
FIG. 5 is a portional perspective view of the fixture utilized in the view of FIGS. 1–3, in which the indexing means of FIG. 4 is shown mounted for rotating a workpiece.

The work holding embodiment of FIGS. 1–2 is also shown as including an indexing disc 70 mounted on the center 42 adjacent the outside face 23 of post 18. The indexing disc is used in the known way after removing the motor and sheaves. Referring now to FIGS. 5 and 6, the indexing disc is shown fastened to the center 42 by means of a set screw 72 passing through a threaded bore in the disc. As also seen in the view of FIG. 4, the indexing disc 70 is provided with a plurality of indexing holes 74. The indexing disc is rotated by means such as a key 76 which rotates center 42 a predetermined amount to correspondingly turn a workpiece 44 through a connecting dog 78 mounted to the workpiece by a set screw 78a, as seen in the view of FIGS. 5 and 6. An angle pin 79 has one arm mounted in passageway 79a of center 42 by set screw 79b. The other arm is seated in a like dimensioned groove (not shown) in the dog 78.

The fixture comprising the rail and posts is shown in the view of FIG. 7 in a work treating embodiment. Such embodiment illustrates use of the fixture in the crush forming technique wherein a form roller 82 is mounted on a single center 83 positioned in posts 16, 18, by set screw 38. As is known in this art, a rotating grinding wheel is brought into contact with the form roller until a crush wheel 84 is formed as indicated by the profile 86 which is formed following the crush grinding operation. It is seen that the same fixture illustrated in the foregoing figures is efficiently used for treating a workpiece, such as a grinding wheel, with means such as the form roller 82. The position of the posts in the rails, as shown in FIGS. 1 and 2, are changed from the face-to-face relationship of the horizontal arms to the face-to-face relationship of the vertical arms as shown in FIG. 7. This is accomplished simply by loosening bolts 28 and 34 in the posts from the top of the fixture so that such posts may be freely moved out at the openings at the opposite ends of the rail, and remounted after reversing. In the remounted position, the horizontal arm is the leading portion of the post which engages the channel 11 so that the face-to-face relationship of the horizontal arms may be obtained. This permits the smaller dimensioned form roller 82 to be securely mounted on the single center between the posts which are again fixed in secured position within the channel by the screws 28, 34.

The view of FIG. 8 shows the fixture disposed similarly as in FIG. 7. In this embodiment, the spacing between the centers in the vertical arms is accurately preset by employing means such as a precision Jo block (not shown). The accurate spacing is necessary for another work treating operation, namely, use of diamond centers 92, 94 to dress a reduced thickness along the edge of a wheel. The formed true width is then used for desired slotting of other work. The tips of the centers have diamonds which are shown as forming the reduced width on the rotating wheel.

The illustration of FIG. 9 shows a further versatile use of the fixture in association with known means for dressing a radius on grinding wheels. Various radii may be formed with such means, including inside and outside quarter circles, and half circles. This embodiment includes the indexing disc 70 having an indexing screw 100 mounted through one of the indexing apertures 74. The threaded shank 102 of the screw 100 is shown extending out of the disc 70 and abutting the top of post 18. An angular bracket 104 is fixed to center 42 by screw 106 which moves through a threaded passageway and contacts center 42. The bracket 104 is shown with a diamond center 108 which can be moved to different positions by operating set screw 110. Such a diamond is used to form the various radii by swinging bracket 104. The bracket is also provided with a bore 112 for receiving a setting pin to be held by set screw 114. The pins are used in the known way as references for measuring the cutting position of the diamond.

By the provision of a fixture in which a rail has an elongated channel open at the opposite ends of the rail, one or more of the L-shaped posts can be mounted so that the horizontal arms are in face-to-face relationship, or can be mounted so that the vertical arms are in face-to-face relationship. The fastening means are released in the posts from the top of the fixture so that the posts can be easily slid through such channels and removed from the openings at the opposite ends of the rails. The posts are remounted by reversing their positions and again securing the posts by tightening the fastening means. By this embodiment, the desired face-to-face positioning of the horizontal arms may be obtained for holding a work piece such as shown in FIGS. 1 and 2. This particular disposition of the posts permits more secure mounting of the workpiece for outside diameter grinding when the fixture is held by a magnetic chuck placed on the surface grinder. The horizontal arm-to-arm relationship also permits the posts to be spaced farther apart for larger workpieces while still keeping the entire base of the horizontal arm fastened to the rail. In other words, the entire area of the base of the posts is in contact for greater rigidity of the fixture in holding the workpiece.

The claims of the invention are now presented. What is claimed is:

1. A work treating and holding fixture to be used in association with surface grinders, or the like, including
   an elongated rail, a dovetail channel extending along the length of said rail, such channel being open at the opposite ends of said rail,
   a pair of like posts mountable to said rail, each of said posts being substantially L-shaped blocks having a vertical arm and a horizontal arm, a dovetail slide on the bottom of the horizontal arm slideably engageable with said dovetail channel, at least one passageway extending through said horizontal arm to the base of the dovetail slide, a fastener threadably engageable in said passageway, said fastener being tightened from the top of the fixture at the L-shaped block to frictionally engage the bottom of said channel and thereby lock the position of the posts therein,
   a center passageway extending through an upper portion of each of said vertical arms, the longitudinal axis of said horizontal arm, and
   a center element translatably positioned in each of said center passageways, means to fix said center in a selected position, whereby
   each of said like posts is removable from said rail by moving said dovetail slide out of either of the openings at the opposite ends of the rail, each of said posts being reversibly mountable in the channel to place either the horizontal or vertical arms in face-to-face position, and each of said center elements being reversibly mountable in each of said center passageways, said reversible mounting being selected for different work operations.

2. A work treating and holding fixture as in claim 1 wherein said rail is formed from two half sections joined together along a mid-line of the floor of the dovetail channel, each of said half section having aligned threaded passageways and threaded fasteners joining said sections, and said rail having a flat bottom for planar contact with the surface of a magnetic chuck.

3. A work treating and holding fixture as in claim 1 wherein the passageway extending through said horizontal arm is an angular passageway starting at the face of the vertical arm and terminating at the base of the dowel slide of the horizontal arm, and each of said posts having second locking passageways extending from the top to the dowel slide at the base of said horizontal arm, said second passageway also having a fastener threadably engageable therein and being tightened from the top of the fixture to frictionally engage the bottom of said dovetail channel.

4. A work treating fixture as in claim 1 wherein said posts are mounted in the rail so the respective vertical arms are in face-to-face relationship, and further including a form roller mounted on a single center which extends through the aligned center passageways of the respective posts, whereby said work treating fixture is adapted to crush a wheel by crush forming.

5. A work treating fixture as in claim 1 wherein said posts are mounted in the rails so that the respective vertical arms are in face-to-face relationship, and further including a diamond center mounted in each center passageway of the respective posts, whereby predetermined separation of said diamond centers is used to form a reduced width edge along a crush wheel.

6. A work holding fixture as in claim 1 which further includes an indexing disc mounted on the portion of the center which extends beyond the face of the vertical arm, and a connecting element joining said workpiece to said center so that operation of the indexing disc correspondingly rotates said workpiece.

7. A work holding fixture as in claim 1 wherein the side of the rail includes threaded mounting apertures, and further including a motor mounting bracket secured to the side of said rail by fasteners engaging said mounting apertures, said mounting bracket having a laterally extending arm, a motor mounted on said laterally extending arm, a motor shaft having an axis parallel to the longitudinal axis of said rail, a driving sheave on the end of said motor shaft, a larger driven sheave having a central opening, the center in the post adjoining said mounting bracket passing through said central opening, fastening means to fix the driven sheave to said center, and a continuous belt turning around said driving and driven sheaves.

8. A work treating fixture as in claim 1 which further includes, in combination, a sine bar in surface-to-surface contact with the bottom of said rail, whereby a workpiece may be desirably tapered by outside diameter grinding.

9. A work treating and holding fixture as in claim 1 wherein the means to fix said center in a selected position includes a threaded passageway, and a threaded fastener which frictionally engages said center when passing through said passageway, said center and passageway being positioned in an upper part of the vertical arm.

References Cited

UNITED STATES PATENTS

| | | | |
|---|---|---|---|
| 3,120,725 | 2/1964 | Milewski | 51—237 |
| 1,660,468 | 2/1928 | Bath | 51—237 X |
| 2,809,474 | 10/1957 | Newman | 125—11 CD |
| 2,077,363 | 4/1937 | Halbert | 125—11 ST |
| 2,746,218 | 5/1956 | Bowie | 51—287 |
| 2,842,905 | 7/1958 | Rolin | 51—216 |
| 3,479,775 | 11/1969 | Smith | 51—237 |
| 3,315,419 | 4/1967 | Daubity | 51—237 |

HAROLD D. WHITEHEAD, Primary Examiner

U.S. Cl. X.R.

125—11 R